Patented Mar. 8, 1949

2,463,829

UNITED STATES PATENT OFFICE 2,463,829

PLASTICIZED ELASTOMER COMPOSITIONS

Philip F. Tryon, Terre Haute, Ind., assignor to Commercial Solvents Corporation, Terre Haute, Ind., a corporation of Maryland No Drawing. Application March 16, 1945, Serial No. 583,170

8 Claims. (Cl. 260—30.4)

1

This invention relates to plasticized elastomer compositions and more particularly to such compositions in which so-called synthetic rubbers are plasticized or softened with softening agents of the class of (acyloxymethyl) oxazolines represented by the formula given below:

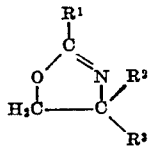

wherein $R^1$ may be an alkyl or phenyl radical, $R^2$ is a member selected from the group consisting of methyl, ethyl and alkanecarbonyloxymethyl radicals, and $R^3$ is an alkanecarbonyloxymethyl radical.

In the manufacture and compounding of rubber and synthetic rubber, it is necessary to bring the compound into a plastic state so that pigment, fillers, and the like can be incorporated therein and so that the product can be molded into the desired shape before vulcanizing such as by extrusion and the like. In the case of natural rubber, simple heating by friction milling on a roller mill is usually sufficient to induce the necessary degree of plasticity for these purposes.

The so-called synthetic rubbers or synthetic elastomers, on the other hand, do not respond easily to milling treatment and often becomes hard and brittle or crumble when subjected to such milling. Furthermore, many addition agents which serve to soften the compound and permit it to extrude readily are of such character that the extruded material fails to remain in the extruded shape and instead tends to return to its original shape after extrusion.

It is, therefore, an object of my invention to provide a class of compounds which not only soften and plasticize synthetic rubbers of the type described hereinafter but which cause a retention of the extruded shape without substantial loss to tensile and elongation characteristics.

These objects are accomplished by my invention in which (acyloxymethyl)oxazolines of the class described are utilized as plasticizers for synthetic elastomers and impart their beneficial softening properties without damage to the tensile strength and elongation characteristics of the resulting composition.

The softening agents of my invention may be employed in conjunction with any of the synthetic rubbers prepared by polymerization of 1,3-butadiene alone or 1,3-butadiene copolymerized with other polymerizable monomers which contain the polymeric structure,

among which may be mentioned the aryl olefines such as styrene and vinyl naphthalene, the alpha methylene carboxylic acids and their esters, nitriles, and amides, such as acrylic acid, methyl methacrylate, acrylonitrile, methacrylonitrile, methacrylamide, and isobutylene, methyl vinyl ether, etc. My softening agents are especially effective when utilized to plasticize butadiene-acrylonitrile type copolymers which are usually recognized as among the most difficult of the elastomers to plasticize satisfactorily.

As illustrative of compounds coming within the above formula, may be mentioned 2-pentyl-4,4-bis(caprooxymethyl)-2-oxazoline; 2-heptyl-4-methyl-4-capryloxymethyl - 2 - oxazoline; 2-heptyl-4-ethyl-4-capryloxymethyl-2 - oxazoline; 2-heptyl-4,4-bis(capryloxymethyl) - 2-oxazoline; 2-nonyl-4-methyl-4-caproxymethyl - 2 - oxazoline; 2-nonyl-4-ethyl-4-caproxymethyl-2-oxazoline; 2,4-diethyl-4-propionoxymethyl-2 - oxazoline; 2-phenyl-4-lauroxymethyl-4 - methyl - 2-oxazoline; 2-undecyl-4 - propionoxymethyl - 4-methyl-2-oxazoline; and the like.

The (acyloxymethyl)oxazolines may be prepared by any desired procedure, for example, by the method described in my copending application Serial No. 553,671, filed September 11, 1944, in which a di- or poly-hydroxy primary amine, and monocarboxylic acid are reacted according to a scheme in which all the steps of the reaction take place in a single operation. Or the compounds of my invention may be prepared as described in copending application Serial No. 482,758, filed April 12, 1943, now U. S. Patent No. 2,372,409, in which the preperation of (acyloxymethyl)oxazolines from esters of nitrohydroxy compounds is described.

The amount of (acyloxymethyl)oxazoline to be used as plasticizer will vary with the relative difficulty of plasticization and the particular elastomer involved and with the degree of softness or plasticity desired. In general my softeners can be employed in a wide range of proportions and preferably within the range of concentrations varying from about 10 to 45 parts by weight of plasticizer for each 100 parts by weight of elastomer.

The plasticizers of my invention impart in general a high degree of plasticity to elastomer compositions, without appreciably reducing the tensile strength and elongation factors. Moreover, the plasticizers of the type herein described all result in extruded or molded compositions which retain their molded shape satisfactorily.

A convenient method for evaluating the effectiveness of plasticizing compositions comprises milling the composition in a standard rubber formula on a conventional rubber mill and then measuring the ease of extrusion as indicated by the extrusion time at various pressures in an extrusion plastometer, for example, in an instrument and according to a method similar to that described by J. H. Dillon in "Rubber Chemistry and Technology," vol. 9, pages 496–501, July, 1936.

In order to evaluate the effect of plasticizer on the tensile and elongation properties of the elastomer, samples of the milled sheet are tested for these factors in the standard Scott tensile tester.

As illustrative of my invention, tensile, elongation and extrusion values as measured by the instrument above referred to were run on a number of representative esters of hydroxymethyl oxazolines of the class described.

The plasticizer was added in each case in the indicated amount in the standard formula given below and milled into the stock in the conventional manner.

*Test composition*

| | Parts by weight |
|---|---|
| Butadiene-acrylonitrile copolymer | 100 |
| Zinc Oxide | 5 |
| Stearic Acid | 1 |
| Benzothiazyldisulfide | 1.5 |
| Sulfur | 1.5 |
| Carbon | 50 |
| Plasticizer | 30 |
| Total | 189.0 |

After milling, part of each sample was subjected to tensile and elongation tests, part was tested in the extrusion plastometer with the results given below:

scribed above the "nerve" of the stock was greatly reduced, that is, the tendency to return to its undistorted state was reduced to such an extent that stocks so treated were of such character as to be readily adapted for use in commercial extrusion processes.

While the above describes the preferred embodiments of my invention, it is to be understood that departures may be made therefrom within the scope of the specification and claims.

What is claimed is:

1. A plasticized elastomer composition comprising a rubber-like synthetic elastomer selected from the group consisting of 1,3-butadiene polymers and copolymers of 1,3-butadiene with another monomer having the following structure:

and a plasticizer having the following structural formula:

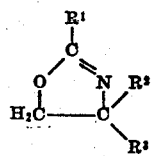

wherein $R^1$ represents a member selected from the group consisting of alkyl and phenyl radicals, $R^2$ is a member selected from the group consisting of methyl, ethyl and alkanecarbonyloxymethyl radicals, and $R^3$ is an alkanecarbonyloxymethyl radical.

2. A plasticized elastomer composition comprising a rubber-like synthetic elastomer selected from the group consisting of 1,3-butadiene polymers and copolymers of 1,3-butadiene with another monomer having the following structure:

and a plasticizer comprising 2-pentyl-4,4-bis-(caprooxymethyl)-2-oxazoline.

*Table*

| Plasticizer | Elastomer | Tensile | Elong. | Extrusion Time at 7¼ lbs. |
|---|---|---|---|---|
| | | | | Seconds |
| None | Hycar OR | 2,280 | 247 | 366 |
| Do | Perbunan | 1,550 | 215 | 1,650 |
| 2-Pentyl-4,4-bis-(caprooxymethyl)-2-oxazoline | Hycar OR | 2,300 | 417 | 10 |
| Do | Perbunan | 2,090 | 305 | 4 |
| 2-Heptyl-4-methyl-4-capryloxymethyl-2-oxazoline | Hycar OR | 1,400 | 297 | 28 |
| Do | Perbunan | 1,840 | 440 | 9 |
| 2-Heptyl-4,4-bis-(capryloxymethyl)-2-oxazoline | do | 2,120 | 465 | 5 |
| 2-Nonyl-4-methyl-4-caproxymethyl-2-oxazoline | do | 1,430 | 405 | 5 |
| 2-Nonyl-4-ethyl-4-caproxymethyl-2-oxazoline | do | 1,500 | 410 | 3 |
| 2,4-Diethyl-4-propionoxymethyl-2-oxazoline | Hycar OR | 3,100 | 550 | 4 |
| 2-Phenyl-4-lauroxymethyl-4-methyl-2-oxazoline | do | 2,800 | 390 | 26 |
| 2-Undecyl-4-propionoxymethyl-4-methyl-2-oxazoline | do | 2,470 | 475 | 14 |
| Dibutyl phthalate | do | 2,980 | 480 | 19 |
| Tricresyl phosphate | do | 2,545 | 395 | 35 |

In the above table, a reduction in extrusion time indicates an increase in plasticity, that is, the more plastic the composition, the more rapidly will it extrude at a given pressure. It will be observed that in the table above the plasticizing effects are high and in most cases are superior to the controls, dibutyl phthalate and tricresyl phosphate, which are usually run in conjunction with such tests for comparison. It will also be observed that in most cases the composition shows little or no loss in tensile and elongation over the original unplasticized batch.

In all of the uncured plasticized stocks de-

3. A plasticized elastomer composition comprising a rubber-like synthetic elastomer selected from the group consisting of 1,3-butadiene polymers and copolymers of 1,3-butadiene with another monomer having the following structure:

and a plasticizer comprising 2-nonyl-4-ethyl-4-caproxymethyl-2-oxazoline.

4. A plasticized elastomer composition comprising a rubber-like synthetic elastomer selected from the group consisting of 1,3-butadiene polymers and copolymers of 1,3-butadiene with another monomer having the following structure:

and a plasticizer comprising 2,4-diethyl-4-propionoxymethyl-2-oxazoline.

5. A plasticized elastomer composition comprising a rubber-like butadiene-acrylonitrile copolymer, and a plasticizer having the following structural formula:

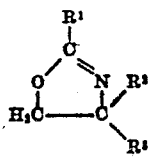

wherein $R^1$ is a member selected from the group consisting of alkyl and phenyl radicals, $R^2$ is a member selected from the group consisting of methyl, ethyl and alkanecarbonyloxymethyl radicals and $R^3$ is an alkanecarbonyloxymethyl radical.

6. A plasticized elastomer composition comprising a rubber-like butadiene-acrylonitrile copolymer and a plasticizer comprising 2-pentyl-4,4-bis(caprooxymethyl)-2-oxazoline.

7. A plasticized elastomer composition comprising a rubber-like butadiene-acrylonitrile copolymer and a plasticizer comprising 2-nonyl-4-ethyl-4-caproxymethyl-2-oxazoline.

8. A plasticized elastomer composition comprising a rubber-like butadiene-acrylonitrile copolymer and a plasticizer comprising 2,4-diethyl-4-propionoxymethyl-2-oxazoline.

PHILIP F. TRYON.

REFERENCES CITED

The following references are of record in the file of this patent:
Karrer, Organic Chemistry, page 67, published 1938, "Elsvier" New York. Nordeman Publishing Company Inc., New York., N. Y.